United States Patent Office 2,870,139
Patented Jan. 20, 1959

2,870,139

PURIFICATION OF D(—)GALACTAMINE

Fred Kagan, Kalamazoo Township, Kalamazoo County, Mich., assignor to The Upjohn Company, Kalamazoo, Mich., a corporation of Michigan No Drawing. Application February 21, 1955
Serial No. 489,740

4 Claims. (Cl. 260—211)

The present invention relates to a novel process for the purification of D(—)galactamine and is more particularly concerned with the purification of D(—)galactamine by the use of ion-exchange resins.

D(—)galactamine, in a purified state, is useful in the resolution of racemic α-hydroxy-β,β-dimethyl-γ-butyrolactone (pantalactone), an important intermediate in the preparation of physiologically active pantathenic acid and salts thereof. The resolution of racemic α-hydroxy-β,β-dimenthyl-γ-butyrolactone is carried out by reacting the racemic lactone with D(—)galactamine to produce a mixture of the novel diastereoisomers, (—)-N-D-dulcityl-L-(α,γ-dihydroxy-β,β-dimethylbutyramide) and (+)-N-D-dulcityl-D-(α,γ-dihydroxy-β,β-dimethylbutyramide), recovering the D(+) diastereoisomer by conventional procedure, e. g., fractional crystallization, and hydrolyzing the D(+) isomer to produce the desirable D(—)α-hydroxy - β,β - dimethyl - γ - butyrolactone. The D(—)α-hydroxy-β,β-dimethyl-γ-butyrolactone is then coupled with β-alanine or a salt thereof, according to known prior art processes, to produce pantothenic acid or salts thereof.

In the present process, purified D(—)galactamine is obtained by contacting an aqueous solution of crude or impure D(—)galactamine with a cation-exchange resin, eluting the adsorbed D(—)galactamine from the resin with a dilute acid to form a D(—)galactamine acid addition salt, and passing an aqueous solution of the acid addition salt through an anion-exchange resin to obtain D(—)galactamine in a purified state.

D(—)galactamine can be prepared by the process disclosed by Holly et al., J. Am. Chem. Soc., 72, 5416 (1950), but the product produced by this process is not suitable for use in resolving racemic pantolactone without further purification, e. g., by the process of the present invention. The disclosed process broadly consists in reacting D(+)galactose with ammonia in the presence of hydrogen and a nickel catalyst to produce crude D(—)galactamine, apparently followed by recrystallization of the crude, to produce D(—)galactamine reported to be only 83 percent pure. This degree of purity is not satisfactory for the resolution of pantolactone. The low purity of the D(—)galactamine can be ascribed to side-reactions which occur during the aforesaid reductive amination of D(+)galactose. Thus the reaction mixtures obtained from such reductive aminations are quite complex, and can include not only the desired D(—) galactamine but also, inter alia, various water-soluble compounds such as dulcitol, and other amine derivatives such as didulcitylamine ("digalactamine"), as well as compounds such as ethylenediamine which are formed by cleavage reactions and various other polyamino compounds derived from D(+)galactose. During the research which led to the present invention, dulcitol, didulcitylamine and ethlyenediamine have been identified in substantial amounts in such reaction mixtures, and potentiometric titration has strongly indicated the presence of other polyamino compounds derived from D(+)galactose. The solubility characteristics of the various componets of such mixtures complicate the separation of the undesired by-products from the desired D(—)galactamine to such an extent that conventional procedures, e. g., recrystallization, are inadequate for the preparation of D(—)galactamine of good purity.

It has now been discovered, in accordance with the present invention, that impure or crude D(—)galactamine can be purified to such an extent that the resulting product is completely satisfactory for various purposes, e. g., for the resolution described above. The present process is adapted to the purification of impure D(—)galactamine prepared by any known procedure, and is particularly adapted to the purification of impure D(—)galactamine prepared by the catalytic reductive amination of D(+)galactose, such as the reaction of D(+)galactose with ammonia in the presence of hydrogen and a base-metal or noble-metal catalyst, e. g., nickel or platinum, wherein the numerous by-products provide major obstacles to the attainment of purifier D(—) galactamine by conventional procedures.

Various cation-exchange resins can be employed in the process of the present invention, preferably those containing sulfonic acid groups or carboxylic acid groups, or both. More particularly, sulfonated cation-exchange resins employed in the present process can be prepared, e. g., by condensation of phenolic sulfonic acids with formaldehyde or by sulfonation of copolymers of styrene, as more particularly described in U. S. Patent 2,684,321. Representative resins of the phenolic sulfonic acid-formaldehyde type include Amberlite IR–100 (Rohm and Haas Company), Dowex 30 (Dow Chemical Company), and Ionac C–200 (American Cyanamid Company), and representative resins of the sulfonated styrene type include Permutit Q (Permutit Company), Amberlite IR–120 (Rohm and Haas Company), and Dowex 50 (Dow Chemical Company). Other satisfactory sulfonic acid resins include sulfonated coal, such as Catex 27 and Catex 55 (Infilco Company).

Carboxylic cation-exchange resins can be prepared by copolymerization of a polymerizable acid such as acrylic acid or methacrylic acid, with a divinyl compound such as paradivinylbenzene. A more complete description of resins of this type can be found in U. S. Patent 2,684,321. Representative carboxylic cation-exchange resins include Amberlite–IRC 50 (Rohm and Haas Company), a polyacrylic acid, and Alkalex (Research Products Corporation), an alkaline oxidation product of coal. An additional satisfactory resin which contains both sulfonic acid and carboxylic acid groups is Zeo-Karb (Parmutit Company).

Suitable anion-exchange resins which can be employed in the present process include, e. g., those which are prepared by condensation of an aromatic amine, such as aniline or metaphenylene diamine, with formaldehyde, as well as melamine condensation products containing free tertiary amino and quaternary ammonium groups as more fully disclosed in U. S. Patent 2,684,321. Specific resins include Amberlite IR–45 (Rohm and Haas Company), a resin containing secondary amino groups, and the following quaternary ammonium resins: Amberlite IR–410 (Rohm and Haas Company), Permutit S–2 (Permutit Company) and Ionac A–300 (American Cyanamid Company).

In carrying out the process of the present invention an aqueous solution of impure D(—)galactamine is contacted with a cation-exchange resin; this can be accomplished in various ways. For example, the D(—)galactamine-containing solution can be passed through a cation-exchange column or the solution and resin can be intimately mixed in a mixing vessel. It is preferable to add the D(—)galactamine as a completely aqueous solution although a partially aqueous solution of D(—)galactamine can also be employed, e. g., D(—)-galactamine dissolved in water plus a water-miscible solvent. Water-miscible solvents which can be employed include dioxan, dimethylformamide, and lower-aliphatic alcohols such as methyl alcohol, ethyl alcohol, and propyl alcohol. The reaction temperature is limited by the thermal stability of the cation-exchange resin employed although the preferred temperature range is between about zero degrees and about fifty degrees centigrade.

The adsorbed D(—)galactamine is fractionally eluted from the cation-exchange resin by the addition of an acid solution. Acids which can be employed include sulfuric, hydrochloric, hydrobromic, trichloroacetic, sulfamic, phosphoric, and the like. The initial acid fractions are rich in D(—)galactamine in contrast to the latter fractions which are composed principally of other amine derivatives. The D(—)galactamine can be crystallized as an acid addition salt from the fractions rich in D(—)galactamine, if so desired, by drying the eluate in a conventional manner, e. g., drying in a stream of hot air with additional drying in a vacuum desiccator over sodium hydroxide. The resulting crystalline D(—)galactamine acid addition salt can be further recrystallized (e. g., from alcohol-water) if so desired. In contrast to the crystalline acid addition salt produced from the fractions rich in D(—)galactamine, the fractions rich in other amino derivatives of the aforesaid kind produce viscous syrups.

Purified D(—)galactamine is, thereupon, generated by contacting the D(—)galactamine acid addition salt in an aqueous solution, i. e., either completely aqueous or with a water-miscible solvent as described above, with an anion-exchange resin, and drying the effluent which contains the purified D(—)-galactamine in a conventional manner. Here again the temperature of the reaction is governed by the thermal stability of the anion-exchange resin although the preferred temperature range is from between about zero to about fifty degrees centigrade. If so desired, the acid fractions rich in D(—)galactamine can be contacted immediately with the anion-exchange resin instead of preparing the crystalline acid addition salt.

The following example is illustrative of the process and product of the present invention but is not to be construed as limiting.

EXAMPLE 1

Preparation of purified D(—)galactamine (A) Preparation of crude D(—)galactamine.—D(+)galactose (150 grams, 0.834 mole) was placed in a one-liter autoclave which was covered with a rubber dam and cooled in a Dry-Ice chest overnight. Four teaspoons of Raney nickel catalyst, washed three times with absolute ethanol, were added to the autoclave with 9.6 milliliters (three percent by weight based on ammonia subsequently added) of water, and cooling was continued for an additional thirty minutes. Liquid ammonia (400 milliliters) was condensed in a glass tube plugged with cotton and the liquid was carefully added to the cooled autoclave which was immediately sealed. Hydrogen was added to a pressure of 1250 pounds per square inch, the stirrer was started, and heat was applied. In one hour, the temperature reached 85 degrees centigrade and the pressure was 1750 pounds per square inch. Hydrogenation at 85 degrees centigrade was carried out for three hours, at which time the pressure had dropped to 1250 pounds per square inch. The system was vented and the contents of the reactor were removed immediately with the aid of hot water. The purple hydrogenation mixture, after removal of the catalyst by filtration, was concentrated under reduced pressure until the odor of ammonia was no longer apparent. The volume was then adjusted to 500 milliliters by adding water.

(B) Preparation of D(—)galactamine hydrochloride.—A 125-milliliter aliquot of the hydrogenation mixture from step A was diluted to 1000 milliliters with deionized water and the resulting solution was put through a bed of IR-120 cation-exchange resin (1″ x 15″) in the hydrogen cycle. The D(—)galactamine and other basic compounds were adsorbed on the column and neutral material, primarily dulcitol, appeared in the effluent (2.3 grams, 6.1 percent based on D(+)galactose). A solution of 114 milliliters of concentrated hydrochloric acid (fifty grams of hydrogen chloride) was diluted to 1000 milliliters and the solution was passed through the column at a rate of six milliliters per minute. Fifty-milliliter fractions were taken and concentrated to dryness in a stream of air at 55–60 degrees centigrade. The residual materials were then further dried in a vacuum desiccator over sodium hydroxide. The product obtained from the first 350 milliliters of eluant was nicely crystalline, whereas the remainder of the material was a very viscous syrup. The crystalline fractions were recombined and recrystallized from ethanol-water to yield 28.2 grams (62.6) percent based on D(+)galactose) of D(—)galactamine hydrochloride, melting point 148–151 degrees centigrade.

(C) Purified D(—)galactamine.—An aqueous solution (fifteen grams in 1000 milliliters) of crystalline D(—)galactamine hydrochloride was passed over a bed of IR-410 (OH cycle) and the resulting eluant was concentrated to dryness to yield 11.8 grams (59 percent based on starting D(+)galactose) of D(—)galactamine with a melting point of 141–145 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the separation of D(—)galactamine from other amine derivatives prepared by reacting D(+)galactose with hydrogen and ammonia in the presence of a catalyst, the steps of contacting an aqueous solution containing the D(—)galactamine and amine derivatives with a cation-exchange resin, fractionally eluting the cation-exchange resin with an acid solution to obtain a fraction rich in D(—)galactamine and a fraction rich in other amine derivatives, and contacting the fraction rich in D(—)galactamine with an anion-exchange resin to produce D(—)galactamine.

2. In a process for the separation of D(—)galactamine from other amine derivatives prepared by reacting D(+)galactose with hydrogen and ammonia in the presence of a catalyst, the steps of contacting an aqueous solution containing the D(—)galactamine and amine derivatives with a cation-exchange resin, fractionally eluting the cation-exchange resin with an acid solution to obtain a fraction rich in D(—)galactamine and a fraction rich in other amine derivatives, drying the fraction rich in D(—)galactamine to produce a crystalline D(—)galactamine acid addition salt, and contacting an aqueous solution of the D(—)galactamine acid addition salt with an anion-exchange resin to produce D(—)galactamine.

3. A process for preparing purified D(—)galactamine from D(+)galactose comprising the steps of reacting D(+)galactose with hydrogen and ammonia in the presence of a catalyst to produce D(—)galactamine and other amine derivatives, contacting an aqueous solution containing the D(—)galactamine and amine derivatives with a resin selected from the group consisting of a sulfonated cation-exchange resin, a carboxylic cation-exchange resin, and a sulfonated-carboxylic cation-exchange resin, fractionally eluting the cation-exchange resin with an acid solution to obtain a fraction rich in D(—)galactamine and a fraction rich in the amine derivatives, drying the fraction rich in D(—)galactamine to produce a crystalline D(—)galactamine acid addition salt, and contacting an aqueous solution of the D(—)galactamine acid addition salt with an amino anion-exchange resin to produce purified D(—)galactamine.

4. A process for preparing purified D(—)galactamine from D(+)galactose comprising the steps of reacting D(+)galactose with hydrogen and ammonia in the presence of a catalyst to produce D(—)galactamine and other amine derivatives, contacting an aqueous solution containing the D(—)galactamine and amine derivatives with a sulfonated cation-exchange resin, fractionally eluting the cation-exchange resin with an acid solution to obtain a fraction rich in D(—)galactamine and a fraction rich in the amine derivatives, drying the fraction rich in D(—)galactamine to produce a crystalline D(—)galactamine acid addition salt, and contacting an aqueous solution of the D(—)galactamine acid addition salt with an amino anion-exchange resin to produce purified D(—)galactamine.

References Cited in the file of this patent
UNITED STATES PATENTS 2,528,022    Van Dolah _____ Oct. 31, 1950